(12) United States Patent
Ruffle et al.

(10) Patent No.: US 8,378,818 B2
(45) Date of Patent: Feb. 19, 2013

(54) DEVICE FOR DETECTING THE PASSAGE OF OBJECTS WITH A RFID LABEL, METHOD AND SYSTEM USING SUCH DEVICE

(75) Inventors: Pascal Ruffle, Les Essarts le Roi (FR); Philippe Pierre, Dugny (FR)

(73) Assignee: I.E.R., Suresnes (FR)

( * ) Notice: Subject to any disclaimer, the term of this patent is extended or adjusted under 35 U.S.C. 154(b) by 641 days.

(21) Appl. No.: 12/532,673

(22) PCT Filed: May 4, 2007

(86) PCT No.: PCT/FR2007/000775
§ 371 (c)(1),
(2), (4) Date: Dec. 21, 2009

(87) PCT Pub. No.: WO2008/116976
PCT Pub. Date: Oct. 2, 2008

(65) Prior Publication Data
US 2010/0102963 A1 Apr. 29, 2010

(30) Foreign Application Priority Data
Mar. 23, 2007 (FR) ...................................... 07 02111

(51) Int. Cl.
*G08B 13/18* (2006.01)

(52) U.S. Cl. ...................... 340/552; 340/572.7; 343/866
(58) Field of Classification Search .................. 340/552, 340/572.1, 572.7, 10.1; 235/385; 343/866
See application file for complete search history.

(56) References Cited

U.S. PATENT DOCUMENTS

| 5,221,831 A | * | 6/1993 | Geiszler | 340/10.1 |
| 7,183,921 B2 | * | 2/2007 | Bonnell et al. | 340/572.1 |
| 2004/0004577 A1 | * | 1/2004 | Forster | 343/866 |
| 2004/0070503 A1 | * | 4/2004 | Monahan | 340/572.7 |
| 2005/0140511 A1 | | 6/2005 | Bonnell et al. | |

FOREIGN PATENT DOCUMENTS

| EP | 0 962 407 A1 | 12/1999 |
| WO | WO 03/034360 A1 | 4/2003 |
| WO | WO 03/094288 A1 | 11/2003 |

* cited by examiner

*Primary Examiner* — John A Tweel, Jr.
(74) *Attorney, Agent, or Firm* — Greer, Burns & Crain, Ltd.

(57) ABSTRACT

A device for the detection of the passage of objects, people or animals bearing a radio frequency identification (RFID) tag, including at least one mobile support which, when at rest, forms a barrier to the passage of the objects, people or animals and which, when in contact with the latter, is capable of moving towards a withdrawn position, this mobile support bearing an antenna connected electrically to an RFID tag reader.

22 Claims, 4 Drawing Sheets

DEVICE FOR DETECTING THE PASSAGE OF OBJECTS WITH A RFID LABEL, METHOD AND SYSTEM USING SUCH DEVICE

BACKGROUND

The present invention relates to a device for the detection of the passage of objects, people or animals bearing a radio frequency identification (RFID) tag.

The invention is also aimed at the use of the device according to the invention to identify objects fitted with RFID tags transported on a conveyor.

In a preferred use of the invention, the aforementioned objects are pieces of baggage transported towards a portal or tunnel.

In this use, the portals or tunnels are fitted with fixed and rigid antennae, connected to an RFID reader which allows the tags fixed or glued on the pieces of baggage to be read remotely, thus allowing the latter to be identified. However, the two parameters below affect the reading of the tags.

The distance between the antennae and the RFID tag
The orientation of the plane of the antenna in relation to the plane of the tag If this distance or orientation is not optimum, the object, i.e. the piece of baggage, is in danger of not being read and failing to be identified.

Moreover, mutual interference between several RFID reading or writing devices can also affect the reliable functioning of the system.

SUMMARY

The purpose of the present invention is to overcome the above drawbacks.

This purpose is achieved, according to the invention, by virtue of a device for the passage of objects, people or animals bearing a radio frequency identification (RFID) tag, characterized in that it comprises at least one mobile support which, when at rest, forms a barrier to the passage of said objects, people or animals and which, when in contact with the latter, is capable of moving towards a withdrawn position, this mobile support bearing an antenna connected electrically to at least one RFID tag reader.

Thus, when the mobile support is displaced by the objects, etc., the plane of the antenna borne by this support changes orientation in relation to that of the RFID tag borne by the objects.

The conditions for reading this tag are thus markedly improved compared with known devices using fixed antennae.

In an embodiment example of the invention, the mobile support is rigid and articulated about an axis located above the passage zone.

Thus, the mobile support pivots when it is encountered by an object.

In a preferred version of the invention, the mobile support consists of a flexible material and is suspended freely at a point located above the passage zone.

Thus, the mobile support bends when it is encountered by an object, remaining in contact with the object, until the latter, continuing its movement, gets away from the mobile support completely. Excellent conditions for reading the tag borne by the objects are thus obtained.

Preferably, the antenna is located close to the lower end of the mobile support so as to be in the passage zone.

Thus, the antenna is located close to the objects to be identified, which allows optimum reading conditions to be obtained.

In an advantageous version of the invention, the support comprises several flexible strips, positioned one beside the other in a plane transverse to the direction of passage of said objects, people or animals, each of said strips bearing, on its lower part, an RFID reading antenna.

Thanks to these juxtaposed flexible strips, it is possible to read several objects passing at the same time through the flexible curtain constituted by the strips or objects located at any point over the width of the passage.

This arrangement makes it possible to avoid any risk of not identifying an object.

Preferably, the flexible strips extend over substantially the whole width of the passage and the lower end of the flexible strips is located close to the bottom of said passage.

Advantageously, the antenna is located on the side of the strip opposite to the side coming into contact with the objects. In this way any risk of friction between the object and the antenna, which could damage the latter, is avoided.

The strips of the device according to the invention can consist of any flexible material, such as synthetic, rubber or fabric material.

The antenna and the electrical conductor connected to it can be constituted by a circuit printed on the strip.

According to another subject of the invention, a system, in particular a baggage handling system, advantageously comprises at least one such detection device. When said device comprises several mobile supports, each bearing an antenna and the system comprising a reader for the information received by the antennae, this system advantageously comprises a multiplexer ensuring a connection between the antennae and the reader. Thus, when several objects cross the barrier at substantially the same time, they can be detected and identified by respective antennae without loss of information, all the information relating to each of the respective objects being read by the reader.

A central processing unit connected to the reader can moreover be provided to ensure the processing of the information read by said reader. Advantageously, the system includes a processing assembly comprising the multiplexer, the reader and the central processing unit. Said assembly can be allocated locally to the detection device. In other words, every detection device is associated with a single processing assembly. The processing assembly can be enclosed in a casing mounted on, or in the immediate vicinity of, said detection device.

The system can moreover comprise remote central processing means, suitable for processing information other than that coming from the processing assembly. Thus, the system can comprise several detection devices, as well as one or more devices for sorting the objects, and the central processing means can be suitable for sorting an object, in particular according to the information gathered when the objects pass through the detection device(s).

The system can be a baggage sorting system on check-in or during transit in an airport. It can also be a postal sorting system.

According to the invention, a method using a detection device according to the invention is characterized in that each of the antennae is interrogated in succession, preferably using a multiplexer ensuring a connection between the antennae and the reader. The successive interrogation is advantageously carried out at such a frequency, depending on the speed of the progress of the object, person or animal crossing said barrier, that any antenna which detects the presence of the object, person or animal is interrogated at least once during the time for which this presence is detected by this antenna.

BRIEF DESCRIPTION OF THE DRAWINGS

Other characteristics and advantages of the invention will also become apparent in the following description.

In the attached drawings, given by way of non-limitative examples.

DETAILED DESCRIPTION

Figure 1:
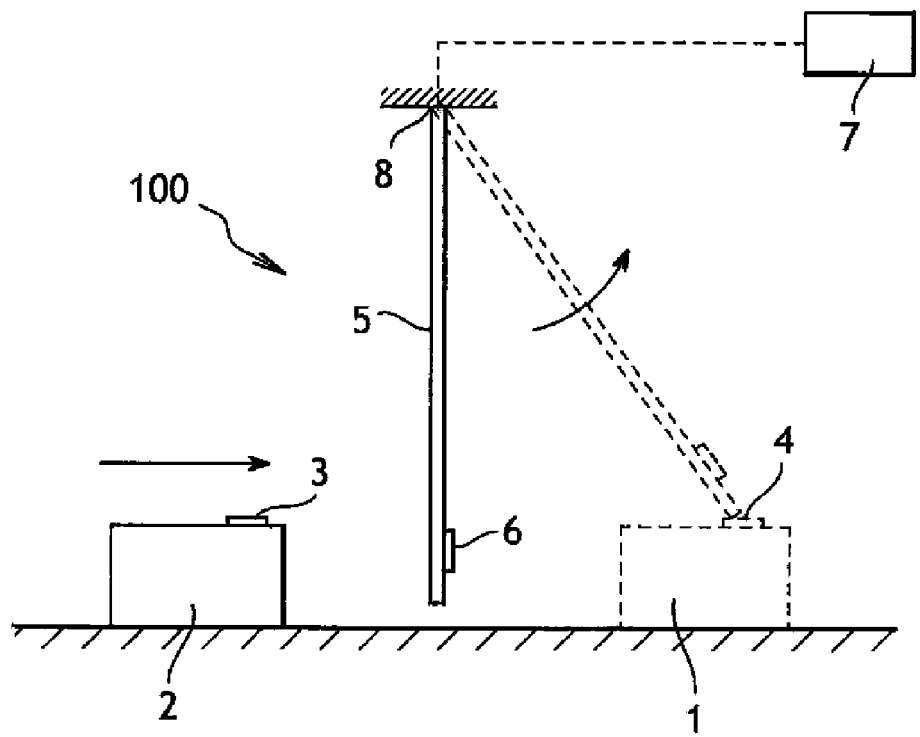
FIG. 1 is a diagrammatic side view of a first example of a device for detecting the passage of objects, according to the invention.
Figure 2:
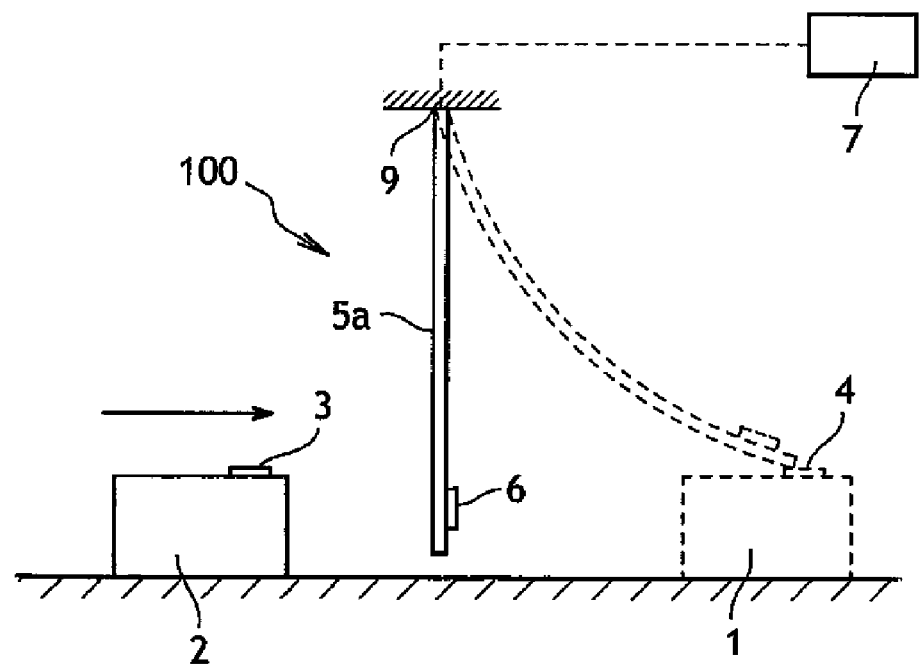
FIG. 2 is a view analogous to FIG. 1, showing another example of the device according to the invention.

As illustrated by FIGS. 1 and 2, the device 100 for the detection of the passage of objects 1, 2 bearing a radio frequency identification (RFID) tag 3, 4 comprises at least one mobile support 5, 5a which, when at rest, forms a barrier to the passage of said objects 1, 2 and which, when in contact with the latter, is capable of moving towards a withdrawn position (represented in dashed lines in FIGS. 1 and 2). This mobile support 5, 5a bears an antenna 6 connected electrically to an RFID tag reader 7.

In the example of FIG. 1, the mobile support is rigid and articulated about an axis 8 located above the passage zone of the objects 1, 2.

In the case of FIG. 2, the mobile support 5a consists of flexible material and is suspended freely at a point 9 located above the passage zone of the objects 1, 2.

In both cases, the antenna 6 is located close to the lower end of the mobile support 5, 5a so as to be in the passage zone of the objects 1, 2.

Figure 3:
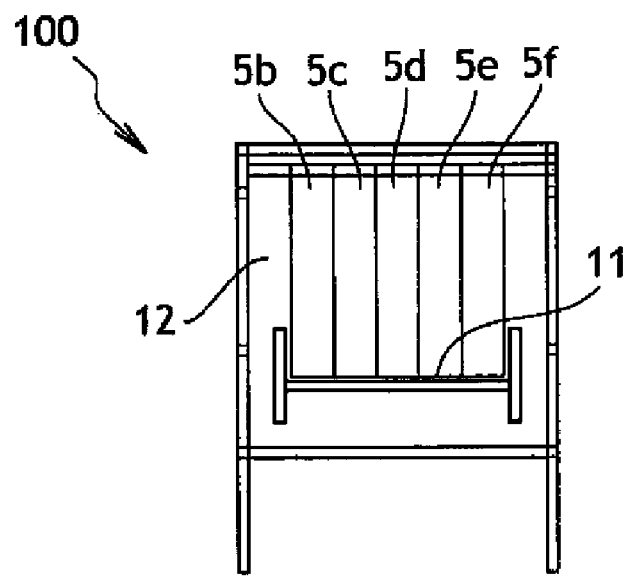
FIG. 3 is a cross-section view of a tunnel for the passage of pieces of baggage fitted with a device according to the invention incorporating several flexible strips.
Figure 4:
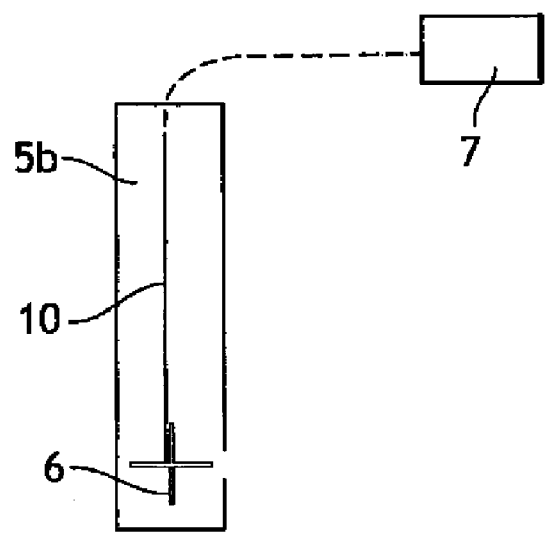
FIG. 4 is a view of one of the flexible strips of the device of FIG. 3.

In the embodiment represented in FIG. 3, the support comprises several flexible strips 5b, 5c, 5d, 5e, 5f, positioned one beside the other in a plane transverse to the direction of passage of the objects. Each of the strips 5b, 5c, 5d, 5e, 5f bears, on its lower part, an RFID reading antenna 6.

In the example of FIG. 3, the flexible strips 5b, 5c, 5d, 5e, 5f extend over substantially the whole width of the passage of the objects and the lower end of the flexible strips 5b, 5c, 5d, 5e, 5f is located close to the bottom of said passage.

Preferably, the antenna 6 is located on the side of the strip 5b, 5c, 5d, 5e, 5f opposite to the side coming into contact with the objects, so as to avoid the latter damaging this antenna 6.

The strips 5b, 5c, 5d, 5e, 5f can be produced in any synthetic or fabric material, provided that it is flexible enough to be able to withdraw when the objects pass.

The antenna 6 and the electrical conductor 10 connected to it can be constituted by an electrical circuit printed on the strip 5b, 5c, 5d, 5e, 5f.

FIG. 3 illustrates a use of the device according to the invention to identify objects fitted with RFID tags transported on a conveyor 11.

In this use, the objects to be identified can be pieces of baggage transported in a tunnel 12 (see FIG. 3), such as those installed in airports.

In the above use, the device according to the invention makes it possible to identify approaching 100% of the pieces of baggage transported on the conveyor.

This result is explained by the fact that the flexible strips 5b, 5c, 5d, 5e, 5f are distributed over the whole width of the conveyor and that the antennae 6 pass very close to the objects 1, 2 and, therefore, to the RFID tags borne by them.

Figure 5:
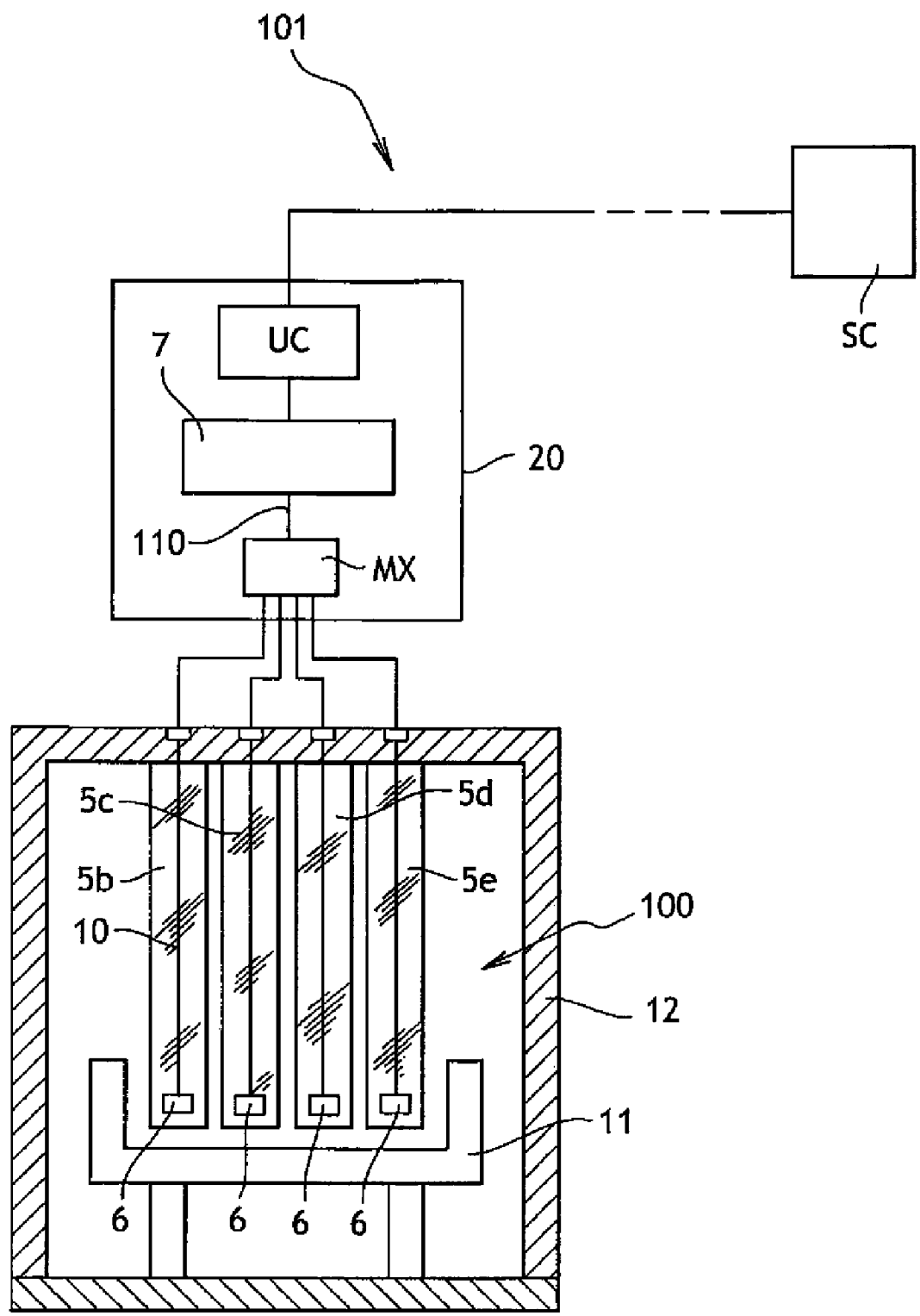
FIG. 5 is a diagrammatic view of a system according to the invention using a device according to the invention.

Turning now to FIG. 5, a system 101 according to the invention will now be described, this system including a detection device 100. The device 100 is substantially the same type as those already described in reference to the previous figures. However, it will be noted that the four strips 5b, 5c, 5d, 5e constituting the barrier are not contiguous, nor overlapping, but have vacant gaps between them. Nevertheless, these strips are close enough together for an object crossing the device 100 to be detected effectively.

The system 101 moreover comprises a processing assembly 20, positioned locally relative to the detection device 100, and central processing means SC positioned remotely relative to the detection device. The processing assembly comprises a multiplexer MX, a reader 7 and a central processing unit UC.

Each of the four strips 5b, 5c, 5d, 5e comprises, at the bottom, an antenna 6 connected to the multiplexer MX by a conductor 10. The information received by the antennae and thus multiplexed is then transmitted via a single conductor 110 to the reader 7 responsible for reading this information. The information is then transmitted to the central processing unit UC to be processed locally. The information can comprise the destination of a piece of baggage which has just been checked in. Once processed locally, this information can then be transmitted, in full or in part, to the central processing means SC.

The central processing means are provided to utilize the data from the system at the level of a central management system. For example, the central processing means can be provided to manage equipment for sorting pieces of baggage. They can be provided in particular to activate systems for routing the pieces of baggage and/or to check that pieces of baggage initially checked in by a passenger actually enter and leave the sorting equipment.

A method using such a system with a multiplexer consists of interrogating each of the antennae of the detection device in succession. This scanning is performed at a frequency calculated according to the speed with which the objects to be identified cross the device, such that any antenna detecting an object is interrogated at least once during the time for which the presence of said object is detected by this antenna. The central processing unit is advantageously configured to avoid a double detection, for example if the same antenna detects the same object during two successive interrogations, or if two different antennae detect the same object at the same time or in succession.

According to a variant, the reader 7 itself can incorporate an algorithm for reading the antennae detecting the signal with the highest amplitude coming from the multiplexer, which thus designates the antenna which is best placed at a given moment to read the tag(s) located on the objects to be checked. The information coming from this antenna is then read completely and recorded by the reader in order to be transmitted to the central management system SC. The reader then reads the new signal received with the highest amplitude and reads the information from the new antenna selected in this way.

It will be noted that a device according to the invention is particularly advantageous compared with the devices of the prior art. Some studies conducted have shown that in a device of the prior art the reading rate for an RFID tag in the least favourable position is on average 71.3%, while in a device according to the invention, incorporating antennae on flexible strips, the reading rate is 93.6%. In the example illustrated, by the least favourable position is meant the case where the tag is located under the object, in contact with the conveyor and near to the metallic materials of the latter.

If all possible positions of the RFID tags on a piece of baggage are taken into account, including the above-mentioned least favourable position, the device according to the invention allows 99.98% of the pieces of baggage passing in front of the antennae of the device according to the invention to be recognized.

Of course, the invention is not limited to the examples that have just been described and can be used to identify any type of objects, whatever their means of transport.

The invention can also be used to identify people or animals crossing an access gateway or portal.

Moreover, a detection device according to the invention can comprise not one antenna on each of the mobile supports, but enough to effectively detect the objects, people or animals which cross it.

Naturally, the detection device according to the invention can also comprise one or more antennae borne by fixed parts, which themselves can also be multiplexed with the antennae borne by the mobile supports. In particular, the fixed antennae can be positioned below the objects crossing the device, thus improving the detection of the RFID tags positioned under the objects.

Figure 6:
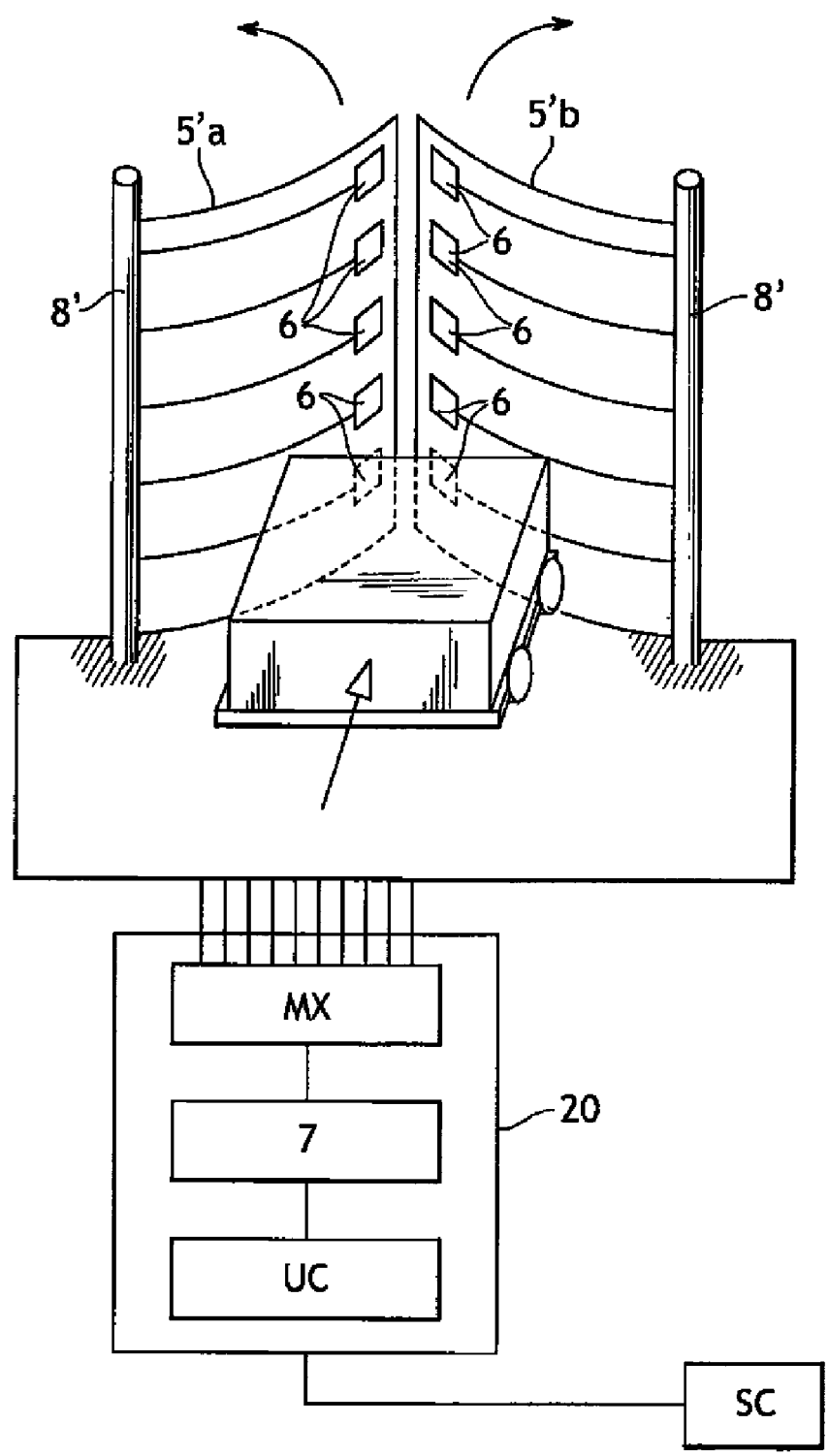
FIG. 6 is a diagrammatic view of a variant of a system according to the invention in which the mobile supports consist of flexible curtains closing off a gateway and opening by pivoting about a vertical axis.

It will also be understood on reading FIG. 6 that the antennae can be placed in various places in the mobile, rigid or flexible supports.

Thus, in the case of supports 5' which can be oriented about vertical axes, the antennae 6 can be positioned vertically one below the other towards the free end of the support 5', mobile about a vertical axis 8', as shown in FIG. 6. But the antennae can also, and without departing from the scope of the invention, be positioned in a sequenced or random manner over the whole surface of the mobile support depending on the place and the objects to which the invention is being applied. These various arrangements allow the invention to be used to check the contents of pallets and boxes in transit in a gateway separating two storage locations. The RFID tags attached to objects positioned inside boxes stacked on a pallet or a trailer can thus be read, by means of the antennae spaced out regularly and vertically on the mobile curtains of the gateway, the latter opening for the passage of the pallet or trailer.

One of the important uses of the present invention is to allow a curtain according to the invention to be inserted in an existing sorting tunnel, without having to make substantial modifications to the conveying system in order to allow an RFID check of the objects placed on the conveyor of the tunnel. In fact, the introduction of the current systems of RFID antennae placed along the walls of an existing sorting tunnel necessitates a replacement of the entirety of the metallic parts of the tunnel and conveyor opposite the antenna zone by plastic parts so as not to interfere with the reading of the antennae. As a result of placing the RFID antennae on a mobile support transverse to the direction of conveyance, as provided for by the invention, the modifications to the conveyor are negligible and inexpensive for the operator.

Moreover, the number of mobile supports, for example of flexible strips, can vary. Thus, there can be only a single support.

The invention claimed is:

1. A system for the detection of the passage of objects, people or animals bearing a radio frequency identification (RFID) tag, comprising:
at least one detection device including a plurality of mobile supports which, when at rest, forms a barrier to the passage of said objects, people or animals and which, when in contact with the latter, is capable of moving towards a withdrawn position, each of said plurality of mobile supports bearing an antenna;
at least one RFID reader, electrically connected to said antennas, for reading information received by said antennas; and
a multiplexer ensuring a connection between said antennas and said reader,
wherein said reader incorporates an algorithm for reading said antennas detecting a signal with a highest amplitude coming from said multiplexer, thus designating the antenna which is best placed at a given moment to read the RFID tag located on the object to be checked.

2. The system according to claim 1, characterized in that the at least one mobile support is rigid and is articulated about an axis located above a passage zone.

3. The system according to claim 1, characterized in that the at least one mobile support is rigid and is articulated freely about an axis positioned vertically on a side of a passage zone.

4. The system according to claim 1, characterized in that the at least one mobile support consists of flexible material and is suspended freely at a point located above a passage zone.

5. The system according to claim 1, characterized in that the at least one mobile support is flexible and is articulated freely about an axis positioned vertically on the side of a passage zone.

6. The system according to claim 2, characterized in that the antenna is located close to a lower end of the mobile support so as to be in the passage zone.

7. The system according to claim 3, characterized in that said device incorporates a plurality of antennae positioned over an entire surface of the at least one mobile support.

8. The system according to claim 7, characterized in that each said mobile support includes a plurality of antennae positioned vertically towards a free end of the mobile support.

9. The system according to claim 4, characterized in that the support comprises one or more flexible strips positioned, one beside the other, in a plane transverse to the direction of the passage of said objects, people or animals, each of said strips bearing an RFID reading antenna.

10. The system according to claim 9, characterized in that the flexible strip(s) extend over substantially an entire width of the passage.

11. The system according to claim 2, characterized in that a lower end of one or more flexible strips is located close to a bottom of said passage.

12. The system according to claim 9, characterized in that the antenna is located on a side of the strip opposite to a side coming into contact with the objects.

13. The system according to claim 9, characterized in that said strips consist of synthetic or fabric material.

14. The system according to claim 9, characterized in that the antenna and an electrical conductor connected to the antenna form an electrical circuit produced using materials appropriate for ensuring the antenna and electrical conductor functions and which are themselves fixed on the strips.

15. The system according to claim 1, characterized in that it moreover comprises a central processing unit connected to the reader for processing the information read by said reader.

16. The system according to claim 15, characterized in that it comprises a processing assembly comprising the multiplexer, the reader and the central processing unit, said assembly being allocated locally to said device.

17. The system according to claim 16, characterized in that it moreover comprises remote central processing means, suitable for processing information other than that coming from the processing assembly.

18. A use of the system according to claim 1 to identify objects fitted with RFID tags transported on a conveyor.

19. The use according to claim 18, characterized in that said objects are pieces of baggage transported in a tunnel.

20. A use of the system according to claim 1 to identify objects fitted with RFID tags, wherein said objects are pieces of baggage transported on a pallet or a vehicle, the system comprising flaps with a vertical axis withdrawing laterally in rotation when the objects pass.

21. A method for the detection of the passage of objects, people or animals bearing a radio frequency identification (RFID) tag, in which a system is used which comprises at least several mobile supports which, when at rest, form a barrier to the passage of said objects, people or animals and which, when in contact with the latter, is capable of moving towards a withdrawn position, each said mobile support bearing a respective antenna, said system moreover comprising a reader for the information received by the antennae, and a multiplexer ensuring a connection between the antennae and the reader, wherein each of the antennae is interrogated in succession to detect a signal having a highest amplitude coming from the multiplexer, thus designating the antenna which is best placed at a given moment to read the tag located on the objects to be checked.

22. The method according to claim 21, characterized in that the successive interrogation is carried out at such a frequency, depending on the speed of the progress of the object, person or animal crossing said barrier, that any antenna detecting the presence of the object, person or animal is interrogated at least once during the time for which said presence is detected by said antenna.

* * * * *